(12) United States Patent
Guenther et al.

(10) Patent No.: US 8,075,778 B2
(45) Date of Patent: Dec. 13, 2011

(54) FLUID SEPARATION

(75) Inventors: Axel Guenther, Somerville, MA (US); Klavs F. Jensen, Lexington, MA (US); Manish Jhunjhunwala, Boston, MA (US); Martin A. Schmidt, Reading, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 505 days.

(21) Appl. No.: 10/546,911

(22) PCT Filed: Mar. 25, 2004

(86) PCT No.: PCT/US2004/009451
§ 371 (c)(1), (2), (4) Date: Nov. 13, 2006

(87) PCT Pub. No.: WO2004/087283
PCT Pub. Date: Oct. 14, 2004

(65) Prior Publication Data
US 2007/0144967 A1    Jun. 28, 2007

Related U.S. Application Data

(60) Provisional application No. 60/457,451, filed on Mar. 25, 2003.

(51) Int. Cl.
*B01D 17/00* (2006.01)
*B01D 19/00* (2006.01)

(52) U.S. Cl. .......... 210/649; 95/260; 210/741; 210/742; 210/749; 210/767; 422/507; 422/527; 436/177

(58) Field of Classification Search .................. 210/85, 210/87, 90, 96.1, 511, 513, 541, 542, 634, 210/639, 739, 741, 742, 649, 749, 767, 800–803, 210/808; 422/62, 69, 70, 100, 101, 501, 502, 505, 507, 527; 436/43, 52, 53, 177, 178, 180; 95/260, 267; 96/204, 322; 366/336–340, 348; 204/451, 601
See application file for complete search history.

(56) References Cited

U.S. PATENT DOCUMENTS
5,076,943 A * 12/1991 Rakow .......................... 210/808
(Continued)

FOREIGN PATENT DOCUMENTS
WO    WO 2005/028066    4/2005

OTHER PUBLICATIONS
International Search Report dated Aug. 17, 2004, mailed Aug. 30, 2004, Re: PCT/US04/09451.
(Continued)

*Primary Examiner* — Joseph Drodge
(74) *Attorney, Agent, or Firm* — Wolf, Greenfield & Sacks, P.C.

(57) ABSTRACT

A method of separating a first fluid from a second fluid may include prewetting with the first fluid at least one channel defined by a separation device, the at least one channel thereby containing a column of the first fluid along its length. A combined flow of the first fluid and the second fluid may be presented to the separation device, so that the at least one channel is in fluid communication with the combined flow. Fluid pressure may be applied across the combined flow and the separation device, but the applied pressure should not exceed the capillary pressure in the at least one channel. Otherwise, the combined flow may be forced through the separation device. In this manner, the first fluid flows through the at least one channel, and the second fluid is excluded from the at least one channel, thereby separating at least a portion of the first fluid from the second fluid.

13 Claims, 10 Drawing Sheets

U.S. PATENT DOCUMENTS

| | | | |
|---|---|---|---|
| 5,932,100 | A | 8/1999 | Yager et al. |
| 5,942,443 | A * | 8/1999 | Parce et al. ............... 506/39 |
| 6,274,089 | B1 | 8/2001 | Chow et al. |
| 6,309,550 | B1 | 10/2001 | Iversen et al. |
| 6,454,945 | B1 | 9/2002 | Weigl et al. |
| 6,666,909 | B1 | 12/2003 | TeGrotenhuis et al. |
| 6,808,929 | B1 * | 10/2004 | Law et al. ............... 436/52 |
| 6,949,176 | B2 * | 9/2005 | Vacca et al. ............... 204/547 |
| 2001/0036626 | A1 * | 11/2001 | Farinas et al. ............... 435/4 |
| 2005/0066812 | A1 | 3/2005 | Vesper et al. |
| 2009/0183871 | A1 | 7/2009 | Salamitou et al. |

OTHER PUBLICATIONS

Gunther, A, et al, "Micromixing of Miscible Liquids in Segmented Gas-Liquid Flow," *Langmuir* 21 (2005) 1547-1555.

International Search Report and Written Opinion from PCT/2006/026464, filed Jul. 5, 2006.

Townsend, R.J. et al., "Fluid Modelling of Microfluidic Separator Channels," *Sensors and Actuators* B 111-112 (2005) 455-462.

Zhu, J. et al., "A Low Temperature Co-Fired Ceramic Mesofluidic Separator," *Journal of Physics*, Conference Series 34, May 9-12, 2006, 734-39.

* cited by examiner

FLUID SEPARATION

RELATED APPLICATIONS

This application claims the benefit of priority to Patent Cooperation Treaty Application Ser. No. PCT/US2004/009451, filed Mar. 25, 2004; which claims the benefit of priority to U.S. Provisional Patent Application Ser. No. 60/457,451, filed Mar. 25, 2003.

BACKGROUND

Fluids are mixed in a wide variety of applications, typically to allow components of the fluids to interact. Once the interaction is complete, or its termination is desired, it can be difficult to separate the fluids efficiently. Additionally, monitoring the progress of an interaction may need a portion of one of the fluids to be separated from the fluid mixture.

DETAILED DESCRIPTION

This disclosure provides systems and methods for separating fluids.

In one embodiment, a method of separating a first fluid from a second fluid may include prewetting with the first fluid a plurality of channels defined by a separation device, each channel thereby containing a column of the first fluid along its length. A combined flow of the first fluid and the second fluid may be presented to the separation device, so that the plurality of channels is in fluid communication with the combined flow. Fluid pressure may be applied across the combined flow and the separation device, but the applied pressure should not exceed the capillary pressure in the plurality of channels. Otherwise, the combined flow may be forced through the separation device. In this manner, the first fluid flows through the plurality of channels, and the second fluid is excluded from the plurality of channels, thereby separating at least a portion of the first fluid from the second fluid.

In some embodiments, the first fluid is a liquid, and the second fluid is a gas. In other embodiments, both fluids are liquids. In any event, "fluid" is understood herein to include liquids and gases.

In another embodiment, a method of manufacturing a device for separating a first fluid from a second fluid may include forming a plurality of wickless channels in a unitary substrate, each channel having a length and a transverse cross-sectional linear measurement (for example, channel diameter or width). The length and transverse cross-sectional linear measurement are so selected that upon being wetted with the first fluid, each channel holds a column of the first fluid along its length, while the second fluid is excluded from the plurality of channels when a fluid pressure not exceeding the capillary pressure of the channels is applied across the channels. During operation, then, the first fluid can contact the columns of first fluid in the channels and flow through the device, while the second fluid cannot overcome the capillary pressure at the entrance to the plurality of channels and so is excluded from them.

In yet another embodiment, a system for separating a first fluid from a second fluid may include (1) a conduit for a combined flow comprising the first fluid and the second fluid, (2) a separation device in fluid communication with the conduit, the device including a plurality of channels in fluid communication with the conduit, each channel of the plurality being so prewetted with the first fluid as to hold a column of the first fluid, and (3) at least one pressure source applying a fluid pressure across the conduit and separation device that does not exceed the capillary pressure in the plurality of channels.

In still another embodiment, a device for separating a first fluid from a second fluid may include a plurality of wickless channels etched or molded in a unitary substrate. Each channel may have a length and a transverse cross-sectional linear measurement. The length and transverse cross-sectional linear measurement may be selected so that upon being wetted with the first fluid, each channel holds a column of the first fluid along its length, and the second fluid is excluded from the plurality of channels when a fluid pressure not exceeding the capillary pressure of the channels is applied across the channels.

The terms "comprise," "comprising," "include," "including," "have," and "having" are used in the inclusive, open sense, meaning that additional elements may be included. The terms "such as", "e.g.", as used herein are non-limiting and are for illustrative purposes only. "Including" and "including but not limited to" are used interchangeably.

In certain embodiments, a microfluidic fluid isolator may consist essentially of at least one microfluidic bore having a transverse linear dimension of less than about 1 micron, wherein the substrate is so selected as to be preferentially wetted by a fluid to be isolated compared to another fluid.

Among many particular embodiments, one of interest is fluid separation techniques on microscale. For example, a complete gas-liquid and/or liquid-liquid separation system can be formed "on-chip" at small scales (scales common to microfluidics applications range from ~10 um to >1 mm, although in some applications, as small as 1 nanometer), that is independent of the effect of gravity and for a large range of fluid flow rates, independent of the proportion of individual fluids in the mixture. In difference to all existing methods, complete separation can be obtained in certain embodiments not only for steady (annular flow) but for transient flows as well (slug, bubbly). I.e., complete separation can be achieved for a mixture of a gas and a liquid (gas-liquid mixture) and a liquid with another liquid with any relative fraction of the two phases. In other embodiments, partial separation may be achieved, such as for sampling and/or testing purposes.

The disclosed systems and methods allow manipulation of a wide variety of patterns, steady or transient, of gas-liquid and liquid-liquid mixtures in microchannels. The disclosed systems and methods also provide reliable separation of gas-liquid and liquid-liquid mixtures into individual phases at high velocities and for altering fractions of the two phases. It allows the introduction of a gas or liquid stream into the flow channel, and their contacting in a variety of ways and separation into individual streams, in precise amounts and at well defined locations along the flow path. Presently this is possible only for steady liquid-only systems and steady annular and segregated gas-liquid flows. Some other methods on macroscale use centrifugal force in a cyclone separator thus utilizing density difference between the fluids in the mixture to cause the separation. Transferring the fluid mixture to a larger container and then using gravity to separate the phases off-chip is common.

We show that such a disclosed device and/or method not only allows easy removal of bubbles from a gas-liquid mixture but is effective in gas-liquid separation for a wide range of gas-liquid mixture fractions, as well as for all steady and transient regimes. Similarly, two liquids may be separated from one another over a wide range of mixture fractions.

A disclosed device and/or method imparts the ability to separately direct the individual fluid streams "on-chip", from any gas-liquid or liquid-liquid mixture in microchannel. Areas of applicability are:

Integration of gas-liquid and liquid-liquid chemical/biological reactions at microscale into microscale systems Mass transfer processes and accurate analysis for other gas-liquid and liquid-liquid contacting applications, e.g. absorption, stripping, distillation, extraction.

Removal of condensate from exhaust of fuel cell.

On-chip evaporation

Sample concentration in microfluidic systems by evaporation of volatiles.

Other microfluidic applications involving gas-liquid and liquid-liquid multiphase mixtures.

Addressing a common problem in microfluidic systems— occurrence of bubbles.

Enables instances which could benefit from introduction of a second fluid stream a gas or a liquid stream in a liquid only system (e.g., mixing of liquids on microscale is diffusion limited, but can be substantially enhanced by introduction of an inert gas stream).

Separation of Emulsions with drop sizes larger than the size of the channels in the separation device.

The economic potential resides in different fields using microfluidics with gas-liquid and liquid-liquid flows for above and other alternate cases. Lab-on-a-chip applications involving gas-liquid and liquid-liquid systems are also markets for this technology, as a disclosed device and/or method for the first time brings gas-liquid and liquid-liquid separation on-chip. Chemical industry segments interested in fine chemicals, hazardous chemical synthesis or characterization of kinetic data for general synthesis involving gas-liquid and liquid-liquid flows would find the a disclosed device and/or method of use. Biomedical and biotechnology applications involving gas-liquid and liquid-liquid flows for purposes of sample preparation, evaporation, reaction or contacting for mass transfer/mixing of reagents in microscale also stand to benefit from this technology.

Such a concept is relevant to a wide variety of microscale applications using a gas-liquid and liquid-liquid flow, and is thought to enable strategies for liquid phase applications that benefit from introduction and subsequent removal of a gas phase. An instance of this: a disclosed device and/or method for inducing mixing within liquid flow on microscale by introduction of a gas phase is shown to be extremely effective. The process steps of mixing liquids through introduction of a gas phase, reacting them and subsequently separating the gas and liquid are also demonstrated in integrated systems microfabricated in a various materials, including silicon, polymer, and metal.

To be able to manipulate fluids or individual phases of a multiphase mixture in a microchannel, is attractive but challenging. The attraction comes from the implications of increased speed, reduced cost and portability to many potential and existent applications of Microsystems to chemical, biological sensing and analysis (blood chemistry, flow cytometry, DNA screening, polymerase chain reactions, bioassays), and of microreactors.

Devices, systems and methods disclosed herein may be adapted to microscale use and/or macroscale use. A device may be adapted for macroscale use by, for example, increasing the number of channels. Devices and methods disclosed herein can be integrated on-chip.

Multistep, microscale chemical/biological processing networks capture capabilities of mixing, mass/heat transfer, reaction, separation, and analysis on a single platform on microscale. They are altering the pace as well as practice of biology and chemistry. However, control of fluid from the output of one microfluidic component to the input node of another, without disturbing other parts of the network sequence, remains a challenge. The efficiency of this fluid routing limits the extent to which a microfluidic network can be interconnected and its functionality. In chemical/biological networks two-phase gas-liquid and liquid-liquid mixtures occur commonly and need to be separated and transferred to subsequent processing steps. Fluidic-phase separators (also referred to as routers) for directing individual phases from a gas-liquid or liquid-liquid mixture over a large range of flow conditions are critical to the realization of networks that can address needs of connectivity.

Fluid flow in a channel is defined by interaction between inertial, viscous, interfacial and body (gravitational, magnetic, electrical) forces. Surface tension force at the interface of miscible (similar) fluids is negligible while immiscible (dissimilar) fluids have large energy associated with the interface. We demonstrate the concept of a phase-router that uses this essential difference between interface of miscible and immiscible fluids for switching between two states. The router does not contain any moving parts and operates in a binary mode. It switches 'on' to be completely-open allowing flow of 'select phase' through it and switches 'off' to completely close, directing the 'second phase' along a different fluidic path. We use it to separate individual phases from gas-liquid and liquid-liquid two phase mixtures.

The phase separation strategy aims at selectively removing one liquid phase, the 'select phase', $\phi_1$, completely from the mixture through the fluid-phase router, thereby also obtaining a separate stream for the other fluid phase, the 'second phase', $\phi_2$. We design the router as a capillary tube of diameter, d~10 μm and operate it with $\phi_1$ filling the router. When $\phi_2$ fraction of the two-phase mixture arrives at the router, a meniscus is formed at its inlet. We choose the router surface, S, such that $\phi_2$ is non-wetting while $\phi_1$ wets the surface. This sets the meniscus curvature such that pressure on the $\phi_1$ side of inlet, $P_{\phi_1}$, is lower than the pressure at the router inlet, $P_i$, the side with $\phi_2$. This pressure drop across the meniscus, $\Delta P_m \equiv P_i - P_{\phi_1}$, can be expressed by the Young-Laplace equation as, $\Delta P_m = \gamma_{\Phi_1-\Phi_2} C$, where C is the meniscus curvature. For a cylindrical capillary tube a spherical shape of the meniscus can be assumed and $C = 4 \cos \theta_{ce}/d$.

The surface of the tube is such that the first fluid preferentially wets the surface with respect to the second fluid, which enables the capillary pressure at the entrance to the tube to resist the flow of the second fluid into the tube when a fluid pressure difference exists across the tube.

The difference in pressure between the router inlet and the outlet, $\Delta P_i = P_i - P_o = \Delta P_m - \Delta P_h + \Delta P_f$, where $P_o$ is pressure at the outlet (often a common port from multiple routers where $\phi_1$ directed through the routers is collected and a constant pressure may be maintained), $\Delta P_h = h \rho_{\phi_1} g$ is the hydrostatic head due to an elevation h of the inlet with respect to the outlet, $\rho_{\phi_1}$ the $\phi_1$ density, and $\Delta P_f$ the pressure drop due to flow through the router. Liquid flows in the router when $\Delta P_f > 0$, or $\Delta P_T - \Delta P_m > 0$, where $\Delta P_T = \Delta P_i + \Delta P_h$, is the total pressure head applied between the inlet and the outlet and equals the sum of excess pressure at the router inlet over the outlet and the hydrostatic head applied.

We show that the meniscus adjusts itself to resist any flow of $\phi_2$ thereby directing $\phi_2$ to an alternate fluidic path for all $\Delta P_T$ less than a maximum pressure $\Delta P_{max}$. In this case with presence of $\phi_2$ fraction at the router inlet, $\Delta P_m = \Delta P_T$ and $\Delta P_f = 0$. However, when portions of the mixture containing $\phi_1$ arrive at the router inlet, the meniscus vanishes. In absence of any interfacial force $\Delta P_m = 0$ and $\Delta P_f = \Delta P_T$, the router switches 'on' and completely opens to allow the $\phi_1$ fraction in the mixture to flow through it under the influence of unbalanced $\Delta P_T$. We use an array of routers to obtain the required flow capacity for directing $\phi_1$ completely from the two-phase mixture, through the routers. We design a router of small length, $l_c$~1 mm, to obtain a low pressure drop for the flow of $\phi_1$ through it. Then the $\Delta P_T$ required for expected flow capacity, can be designed as a small fraction of $\Delta P_{max}$. Assuming a fixed $P_o$, the meniscus then adapts to pressure fluctuations at the inlet smaller than $(\Delta P_{max} - \Delta P_T)$.

Due to presence of interfacial forces, the flow of immiscible fluids, like an organic and an aqueous phase or a gas and liquid, can assume different patterns: bubbly flow, with small bubbles of one phase dispersed in the other phase, plug/slug flow with bubble size comparable to the channel diameter, and annular with one phase forming the core of channel while the other surrounds and flows at the periphery, and are all observed on microscale. These regimes are commonly encountered, and attractive in various chemical processing applications, including those requiring good contacting between immiscible phases. We show that the capability of meniscus to adapt to pressure disturbances and spontaneously self-actuate between the two states, allows separation of two-phase mixtures across different flow patterns, including transient 'bubbly' and 'slug' regimes.

Adaptation of Meniscus in a Single Capillary

We observe the spontaneous self-adaptation of the liquid meniscus using a single capillary tube. When one end of a capillary tube is dipped in a trough containing liquid that wets the capillary wall, the liquid rises inside the tube to a level higher than the level of liquid in the trough. This capillary rise is due to a pressure difference, $\Delta P_m = 4\gamma_{\phi_1-V} \cos(\theta_{ce})/d$, created across the meniscus. The liquid rises in the capillary to a height $h_{ce}$ such that the hydrostatic pressure drop in the column of liquid in capillary, $\Delta P_h = \rho_{\phi_1} g h_{ce}$, is equal to $\Delta P_m$ and $h_{ce} = 4\gamma_{\Phi_1-V} \cos(\theta_{ce})/(\Delta \rho g d)$, where g is the gravitational acceleration and the pressure contribution due to gravitational head of air is neglected in comparison to that of liquid (assuming $\rho_{\phi_1} \gg \rho_{air}$) $\theta_{ce}$ being an equilibrium property is determined solely by the thermodynamic parameters and for a certain solid-liquid-fluid system, for a capillary of a given diameter the capillary rise, $h_{ce}$, must be fixed.

Figure 1A:
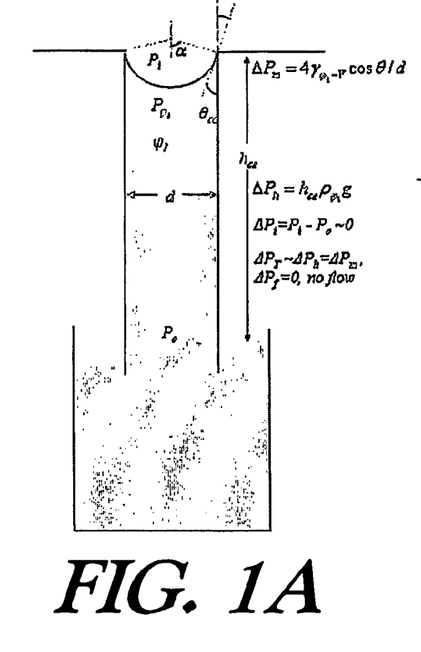
FIGS. 1A and 1B show schematics of meniscus adjustment in a capillary.
Figure 1B:
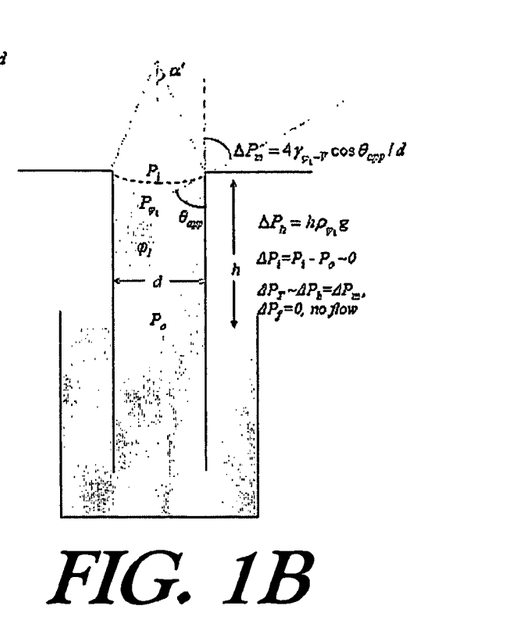

However, the influence of contact angle is indirect, as contact angle in small diameter capillaries controls the radius of curvature of the meniscus which in turn regulates $\Delta P_m$. Then the curvature C can be expressed as, $C = 4 \sin \alpha/d$ and the radius of curvature, $R = d/(2 \sin \alpha)$, where $\alpha = \pi/2 - \theta_{ce}$, is the angle of curvature, (FIG. 1A). We use a 340 μm diameter glass capillary tube, with one end lowered in a trough containing water, $\gamma_{water-air} = 72$ dynes/cm, $\theta_{ce}$~0° and $h_{ce}$~8.4 cm. When the height, h, between the capillary-top and the liquid free surface in the trough is kept less than $h_{ce}$, the liquid rises through the entire length of the capillary and the meniscus rests at its top. At the capillary top, the meniscus still has a contact angle $\theta_{ce}$ and $\Delta P_m = \rho_{\phi_1} g h_{ce}$, is still greater than the downward hydrostatic force, $\Delta P_h = \rho_{\phi_1} g h$, corresponding to height h. At the top of a capillary when the surface suddenly changes angle, the curvature attempting to advance under the influence of $(\Delta P_m - \Delta P_h)$, adapts to establish the contact angle at the next surface, beyond the edge. Here the contact line remains pinned at the edge while α decreases from $(\pi/2 - \theta_{ce})$ to a value $\alpha' = \pi/2 - \theta_{app}$, where $\theta_{app}$ is the apparent contact angle. As a result, the pressure drop across the meniscus decreases and new $\Delta P_m = 4\gamma_{\phi_1-V} \cos(\theta_{app})/d = \rho_{\phi_1} g h$, (FIG. 1B).

Figure 2:
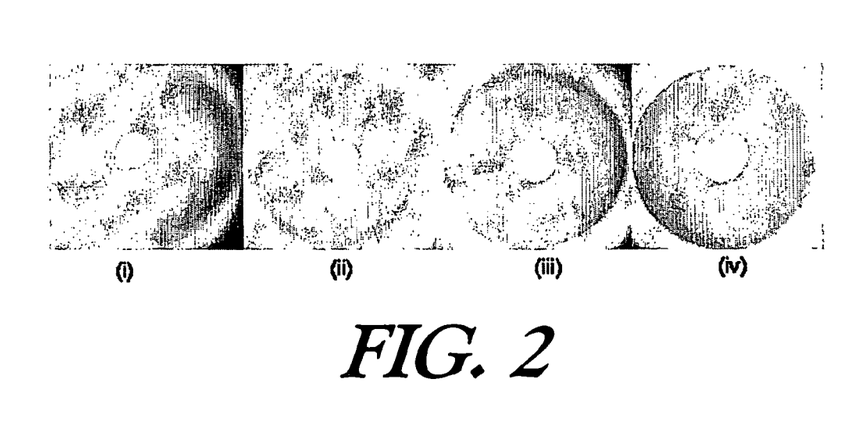
FIG. 2 shows several views of a water meniscus adapting in response to changing water height.

Adaptation of curvature when the contact line remains fixed is called pinning and is observed when the contact line is at an edge on a surface and the surface changes angle due to microscopic roughness or otherwise. If the capillary is moved vertically up or down to vary the height h, the meniscus at the top of capillary adjusts to balance the hydrostatic head in the liquid column for all h<the maximum height, $h_{cmax}$. FIG. 2 shows top views of an adapting water meniscus in a single circular capillary (d=340 μm, $h_{ce}$~8.4 cm), observed with a 20× magnification, in response to changing h, (i) h=0.68$h_{ce}$ (ii) h=0.59$h_{ce}$ (iii) h=0.53$h_{ce}$ (iv) h=0.41$h_{ce}$. The central flatter part of the meniscus appears bright due to light refracted out through it, while the peripheral region appears dark as most light in this region undergoes reflection at the meniscus, back into the liquid in the capillary. As h is decreased the meniscus assumes a flatter shape and the central bright region that transmits the light becomes larger, case (i) to (iv). In addition when the meniscus becomes more curved, the meniscus depth increases and the focal planes of two regions become more distant. As a result, when the central part is focused the peripheral region appears blurred, cases (i)-(iii). Flatter meniscus implies when the central part is brought into focus the peripheral portion also appears sharp, case (iv).

Then for any such h, $\Delta P_h = \rho_{\phi_1} g h = \Delta P_m$, and must be balanced by a reduced upward component of the surface tension force due to an apparent contact angle $\theta_{app} > \theta_{ce}$, so that $h = 4\gamma_{\phi_1-V} \cos(\theta_{app})/(\rho_{\phi_1} g d)$.

Adaptation of Meniscus in an Array

Figure 3:
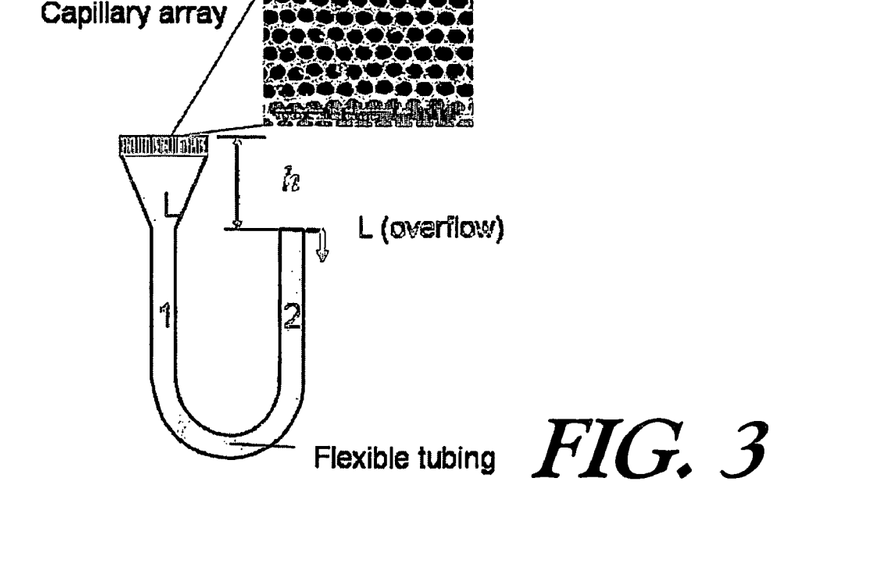
FIG. 3 shows a schematic of a separation system.

We show the same adaptation of meniscus using an array of capillaries and model water ($\phi_1$)-air ($\phi_2$) and ethanol ($\phi_1$)-air ($\phi_2$) systems. We use a 10.4 mm diameter glass-array, 0.762 mm thick, containing capillaries of diameter 10 μm (Collimated Holes Inc). The length of each capillary in the array is equal to the array thickness. Single capillaries, of long length, can be used to study the adaptation of liquid meniscus at the top as described, and the difference in height between the meniscus in the capillary and the liquid free surface in the trough is altered by moving the capillary vertically up/down. For short capillaries in the array as above, we use a setup including of a 'U' shaped flexible tube, 5 mm in diameter and filled with liquid. The glass-array is attached to a conical casing at the fixed end of tube in arm '1', while the other end in arm '2' is kept free to move up or down along a scale, (FIG. 3). Due to capillary rise, the liquid quickly rises through the small length of the capillaries and forms a meniscus at their inlets when the 'U' tube and the conical casing are filled. Using this setup we maintain and vary a difference in level, h, and the hydrostatic head, ($\Delta P_h = h\rho_{\phi_1}g$), between the liquid meniscus in the capillaries and the free surface of liquid, at the outflow, in arm '2'. The large inner diameter of the U-tube is used so that the interfacial force acting at the outflow is negligible compared to that in the capillaries.

Figure 4:
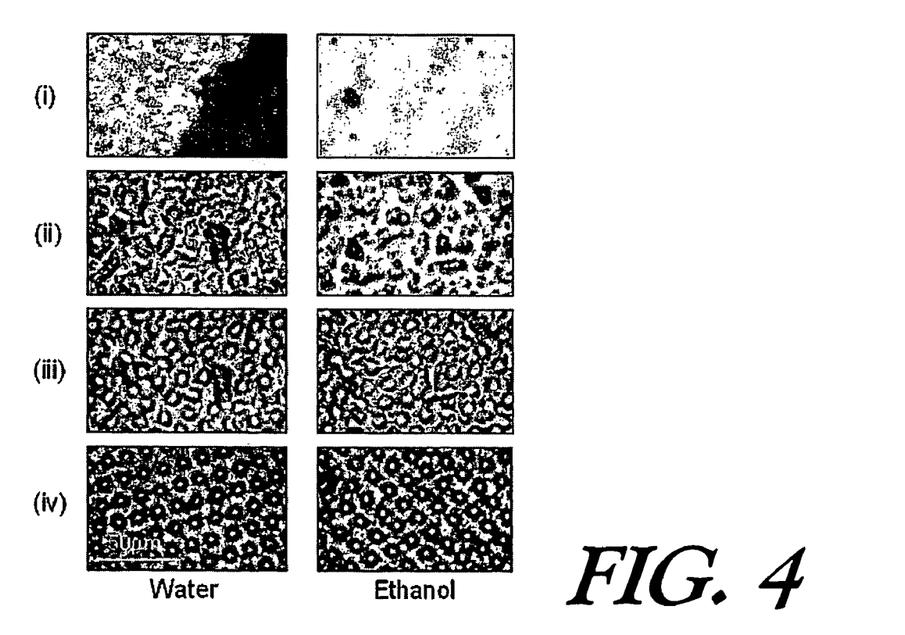
FIG. 4 shows several examples of menisci in separation devices under various conditions.

The liquid meniscus becomes flatter when $\Delta P_h = h\rho_{\phi_1}g$ is reduced while becomes more concave, assuming a smaller contact angle when $\Delta P_h$ is increased, as shown for the two systems. FIG. 4 depicts a section of an array observed with an interference, 40× objective to record adaptation in the valve menisci at different $\Delta P_h'$, for water (left column) corresponding to (i) h<0, flooding state, (ii) h=40 cm, (iii) h=80 cm (iv) h>100 cm, and ethanol (right column) (i) h<0, (ii) h=17 cm, (iii) h=29 cm and (iv) h=45 cm. A balance is obtained between the adapting upward component of the surface tension force and the hydrostatic force for all $h_{cmax} > h > 0$. For $\Delta h > h_{cmax}$, the liquid menisci are forced out of the valves as the liquid flows out from the outflow in arm '2'.

The meniscus has an ability to self-adjust to different curvatures and balance $\Delta P_h$, so that $\Delta P_h = \Delta P_m$ at all points. The maximum $\Delta P_h$, that can be supported before the meniscus collapses, and is forced out of the capillaries, $\Delta P_{max}$, is $2\gamma_{\phi_1-\phi_2} \cos(\theta_r)/r$, corresponding to the receding contact angle $\theta_r$, and the maximum height, $h_{cmax} = 4\gamma_{\phi_1-\phi_2} \cos(\theta_r)/(\rho_{\phi_1}gd)$. For r=5 μm, for ethanol-air system, $\gamma_{\phi_1-\phi_2} \sim 0.022$ N/m at 20° C., and, $\cos(\theta_r) \sim 1$, $\Delta P_{max} = 8.9$ kPa (~0.9 m of water) and $h_{cmax} = 1.1$ m, for water-air system, $\gamma_{\phi_1-\phi_2} = 0.072$ N/m at 20° C., $\cos(\theta_r) \sim 1$, $\Delta P_{max} \sim 28.8$ kPa (~2.9 m of water) and $h_{cmax} = 2.88$ m.

Dynamics and Flow Capacity of Array

Figure 5A:
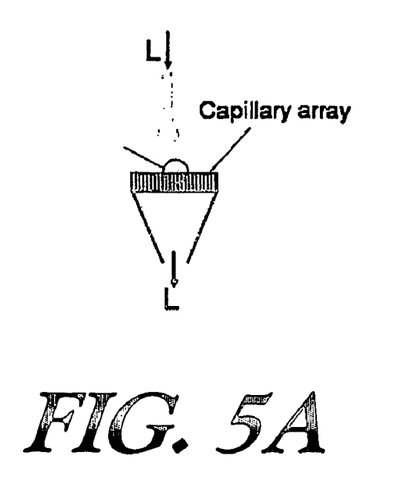
FIG. 5A schematically depicts an exemplary separation device.
Figure 5B:
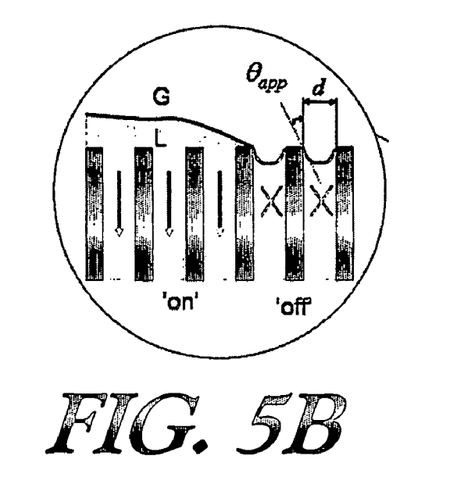
FIG. 5B shows detail of a portion of FIG. 5A.

The above setup used to vary the height difference between the liquid menisci in the capillaries of array and the liquid free surface in arm '2' creates the same effect on $\Delta P_T$ as the vertical movement of a single capillary in a trough, described earlier. We use this setup with liquid dispensed on the array surface to study the self-actuation and flow capacity of the routers at different $\Delta P_T$, for model water ($\phi_1$)-air ($\phi_2$) system, (FIGS. 5A-B). Here, $\Delta P_i \sim 0$ and $\Delta P_T = \Delta P_h$, as no excess pressure is applied between the air above the meniscus and that above the liquid free surface at the end of U-tube. Then in presence of a meniscus at the inlet, $\Delta P_m = \Delta P_T$ and $\Delta P_f = 0$. However, as the meniscus is destroyed by the incoming liquid, interfacial force disappears and the capillaries receiving the liquid allow it to flow out under the action of unbalanced $\Delta P_T$ as the meniscus vanishes. By choosing a large diameter for the U-tube, the pressure drop due to flow in the U-tube can be neglected in comparison to that in the valves. Then for these capillaries $\Delta P_m = 0$, $\Delta P_T = \Delta P_f$ and is varied through changes in h. The meniscus stays at rest in the remaining capillaries which still have an interface at the inlet. Thus each capillary in the array independently allows the flow of liquid through it when receiving liquid while has the air-liquid-solid interface reestablished and resists any gas to flow through in absence of liquid.

Figure 6:
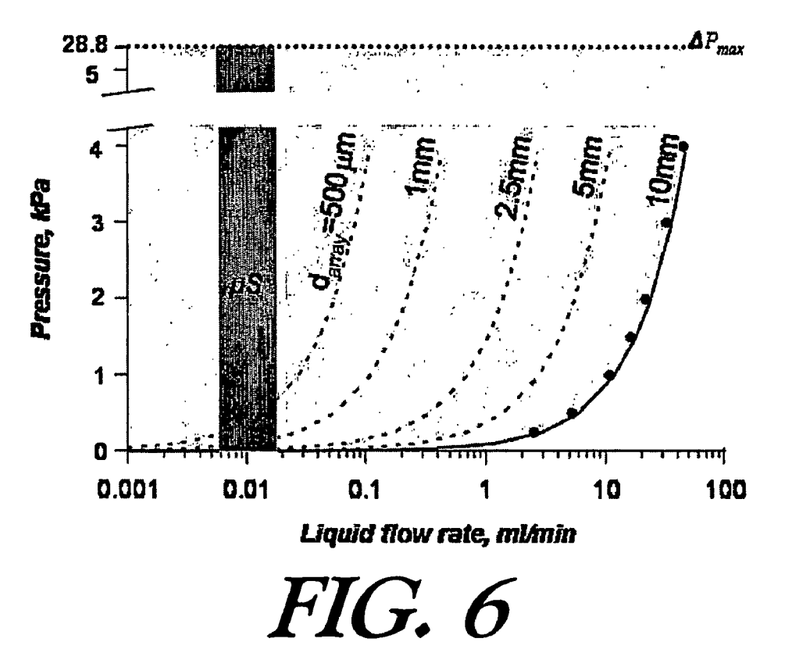
FIG. 6 is a graph showing the relationship between pressure across a separation device and liquid flow rate for devices having variously-sized channels.

We increased the rate of incoming liquid to the array until a thin liquid film covered all the capillaries, thereby switching 'on' all of them. At this point the maximum flow capacity of $\phi_1$ through the array for a particular $\Delta P_T$, is reached. The diameter being small, Reynolds number is low and Stokes flow is obtained in the capillaries. The pressure drop $\Delta P_f$ due to liquid flow in the capillaries can then be calculated using the Hagen-Poiseuille equation as $\Delta P_f = 32 \mu u l_c/d^2$, while the velocity u through each capillary is $Q/(n\pi d^2)$, where Q is the total incoming liquid rate, and n is the number of capillaries in the array. Since $\Delta P_T$ must provide for $\Delta P_f$, the maximum velocity in each valve, $u_{max} = \Delta P_T d^2/(32 \mu l_c)$ and maximum flow rate through the array, $Q_{max} = u_{max} n\pi d^2$, can be calculated for various $\Delta P_T$, (FIG. 6). The array size allows the choice of the number of routers that can be accommodated. This can be designed from the knowledge of the flow capacity desired from the array. Even for arrays of size ~500 μm, $\Delta P_T \sim 5\%$ of $\Delta P_{max}$ is sufficient for flow rates common on microscale (region μS). A single array can then be used for phase separation from a large number of parallel streams with separation being unaffected by disturbances in individual streams. This characteristic, combined with high resistance to flow of $\phi_2$ and spontaneous actuation between two states makes the concept well suited for reliable phase separation and integration with different parts of a chemical/biological processing network.

Independence with Orientation in Gravitational Field

Figure 7A:
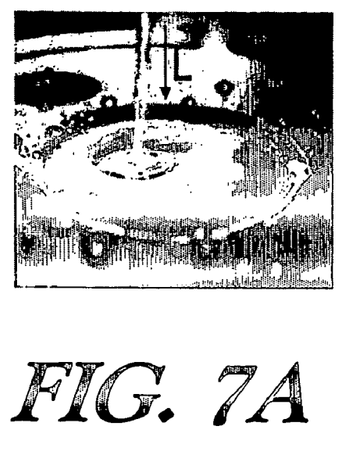
FIGS. 7A and 7B show operation of an exemplary device in different gravitational orientations.
Figure 7B:
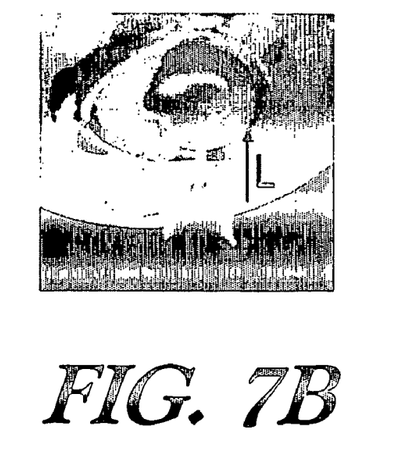

The routing of individual phases from a two-phase mixture is desired to be independent of the orientation of the routers in the gravitational field. We use the above setup to show $\phi_1$ directed through the routers irrespective of the array orientation. Liquid is drawn in and flows out the array in both instances; when dispensed downwards on the array (FIG. 7A) and when directed upwards to the array positioned above the liquid nozzle (FIG. 7B). A $\Delta P_T = 0.05 \Delta P_{max}$ is provided in each case. The downward gravitational force on liquid that comes in contact with any capillary in the array is much smaller than the force due to $\Delta P_T$ drawing the liquid into the capillary. Assuming $\Delta P_T$ is a fraction of the $\Delta P_{max}$ (depends on the interfacial force), then the Bond (Bo) number gives an estimate of the relative magnitude of the gravitational and the interfacial force. For water-air system, in a capillary d=10 μm the density difference between two phases, $\Delta \rho \sim 10^3$ kg/m³, $\gamma_{\phi_1-\phi_2} 0.072$ N/m, g=9.8 m/s², Bo=$\Delta \rho g d^2/\gamma_{\phi_1-\phi_2} \sim$1e-6 and thus the force due to $\Delta P_T >>$ gravitational acceleration. This independence with orientation in the gravitational field coupled with the robustness of operation with respect to pressure fluctuation in the two-phase flow makes the fluid phase routers well suited for convenient integration into microfluidic systems.

EXAMPLES

The principle for operation of fluid-phase separators and the devices realized (through metal-machining and silicon microfabrication technology) are described earlier. We use the concept for separating individual phases from gas-liquid and liquid-liquid two-phase mixtures for a range of flow regimes.

Example 1

Complete Separation/Phase Separation on Microscale

Figure 8:
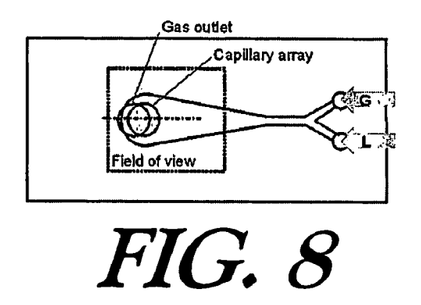
FIG. 8 shows an exemplary embodiment of a separation system.

FIG. 8 shows the schematic top view of the device machined in aluminum, with two inlets for introduction of individual phases, a channel to mix the two phases and an array of capillaries for separation of individual phases at the end of the channel. For gas-liquid phase separation, we use the nitrogen-water combination as a model system while the toluene-water combination is used as an example system for separation of immiscible liquids on microscale. We use a syringe pump (Harvard PHD 2000, Harvard Apparatus), to pump liquid loaded into syringe of required size, to the device. Gas is introduced into the channel through a mass flow controller (MFC, Unit Instruments), of required flow capacity, fed from a pressurized cylinder. For liquids, the flow rate is directly adjusted from the syringe pump settings whereas the gas-flow rate is controlled using the MFC. In this way we vary the velocity, of individual phases in the channel.

Figure 9:
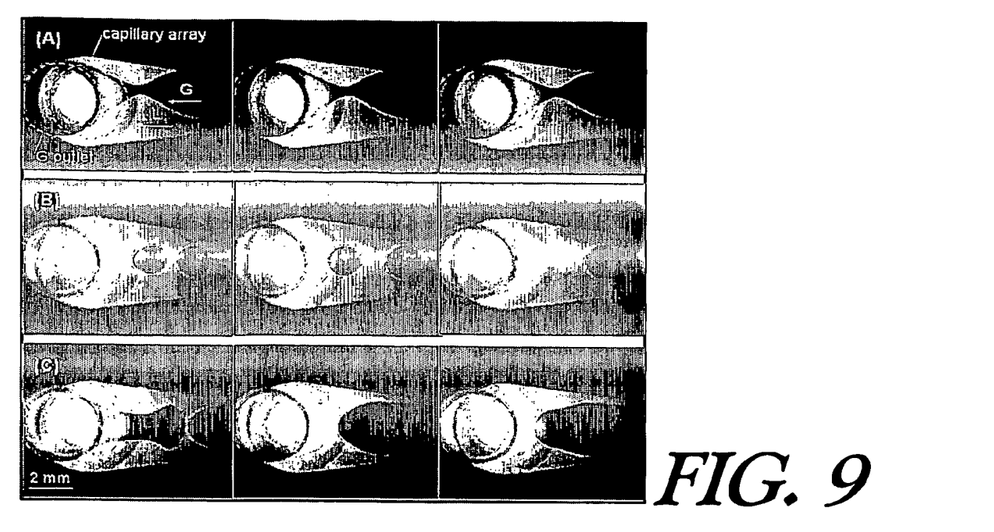
FIG. 9 shows examples of different gas-liquid flow regimes.

For gas-liquid separation we use a hydrophilic glass capillary array so that ethanol is wetting while nitrogen is the non-wetting phase. The two phases are contacted in the channel preceding the array, to obtain a two-phase flow. Ethanol is colored with rhodamine dye for fluorescence. We vary the velocities of the two fluids to show complete separation for various fractions of the phases in the mixture ranging from pure liquid to gas only flow, including different steady and transient flow patterns. FIG. 9 depicts different gas-liquid flow regimes obtained with various combination of gas (nitrogen) and liquid (ethanol) velocities. The dark region within the channel is the gas phase, while the fluoresing region, the liquid phase. (A) Steady flow, gas-liquid interface unaltered with time, is obtained for high gas and low liquid superficial velocity ($j_G$=3.8 m/s, $j_L$=0.008 m/s). (B) For low gas and higher liquid superficial velocity ($j_G$=0.027 m/s, $j_L$0.04 m/s) a transient regime with gas bubbles is obtained while for (C) moderate gas and liquid velocities ($j_G$=0.7 m/s, $j_L$=0.04 m/s) a highly transient slug flow regime is obtained. We obtain complete separation of the two-phase mixture for different velocity combinations of the phases.

We collect ethanol flowing out the capillaries of the array to a common port in a single large tube attached at the end of port. We maintain a liquid pressure corresponding to ~10 cm of ethanol between the inlet to the capillaries and the outlet at the end of tube. The total pressure head driving the ethanol flow through the capillaries, is approximately 14% of the capillary pressure (i.e. the maximum allowable pressure difference) for d=15 μm.

By using a hydrophobic capillary-array, a two-phase mixture of aqueous and organic phases can be separated analogous to the above gas-liquid mixture. The metal device is coated with OTS (octadecyl trichlorosilane) to obtain a hydrophobic surface. The device is first cleaned in an oxygen plasma for 2 min at 0.15-0.2 torr $O_2$ pressure. Silanization of the device is done in a 2% OTS solution in anhydrous toluene for 1 h at room temperature. After the coating, the device is rinsed sequentially with acetone and ethanol, and blown dry in a stream of nitrogen prior to use. Liquid-liquid flow is created in a microchannel by contacting organic (toluene) and aqueous (water) phases. In this example toluene wets while water does not wet the hydrophobic surface. We obtain complete separation between the organic and aqueous phases as the organic phase in the mixture is directed through the array thus leaving a pure stream of the aqueous phase as well.

Example 2

Complete Phase Separation/on Microscale Using Silicon Microfabricated Device

Figure 10:
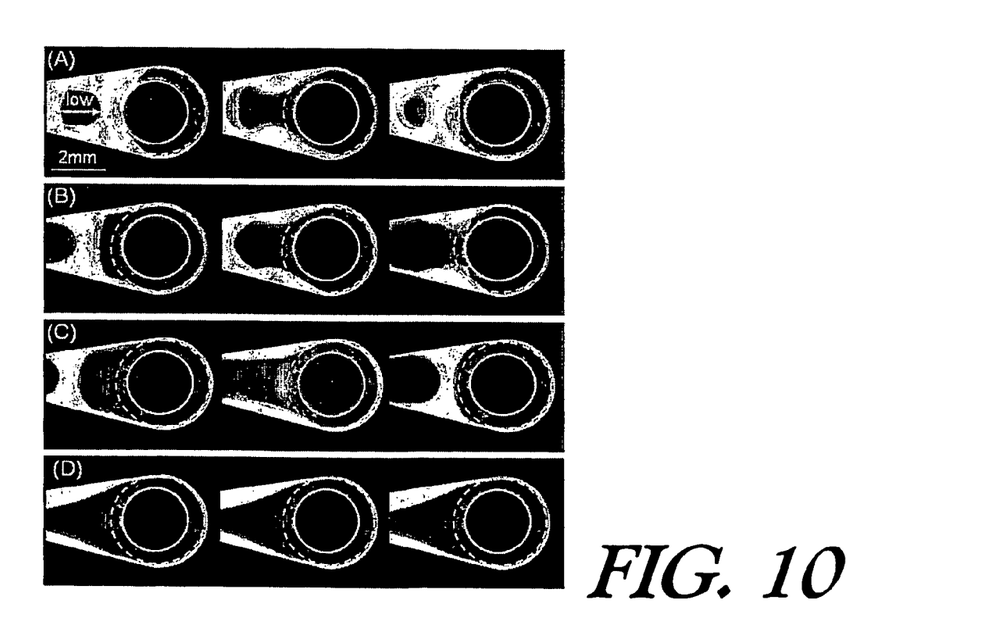
FIG. 10 shows examples of different gas-liquid flow regimes.

The silicon microfabricated device with a capillary-array, is used for separation of a mixture of nitrogen and ethanol. Ethanol wets the hydrophilic silicon oxide array surface whereas nitrogen is non-wetting. Individual phases are fed to the silicon device in the same way as described for metal-machined device. Once again we vary the velocities of the two fluids to show complete separation a cross different steady and transient regimes of the two-phase mixture, obtained for various combinations of phase velocities, (FIG. 10). We use the total pressure head for driving the flow in the same fashion as before, and $\Delta P_h$=10 cm of ethanol=18% of $\Delta P_{max}$ (i.e., the capillary pressure for d=20 μm). This pressure head is controlled by attaching small plastic tubes to the silicon device and controlling the relative pressures of the inlet and outlets. The gas-liquid separators can be connected in series by adjusting the pressure drop over each capillary remain lower than the capillary pressure for the individual device.

Example 3

Sampling

Individual (or multiple) microchannels ones can be used to sample a small quantity of liquid from a two-phase gas-liquid or a liquid-liquid flow inside a microchannel. The sampled liquid is a source of information of local fluid properties (e.g. concentration, temperature, and pressure). These properties can be determined by integrating local sensors or by connecting to a suitable off-chip analysis device (e.g., chromatograph, mass spectrometer, thermocouple, and pressure sensors). Such a measurement at any point along a microchannel can then used to obtain understanding of process efficiency parameters including mass transfer performance, reaction kinetics and for characterization of catalysts in microscale multiphase systems.

We demonstrate separation of a small portion of the organic phase from a two-phase organic-aqueous mixture flowing in the main-channel (400 μm wide and 470 μm deep) of the silicon device. A side-channel 10 μm wide and 40 μm deep at the point of intersection with the main channel serves as a router as described earlier. As before a hydrophobic surface coating is required such that the organic phase wets while the aqueous phase is non-wetting with the surface. This is realized through silanization of the device, done by continuously flowing through the microchannels a 2% OTS (octadecyl trichlorosilane) solution in anhydrous toluene for 1 h at room temperature. It is important that moisture does not come in contact with the coating solution inside the channel. Any contact with the moisture can lead to polymerization of solution resulting in precipitation and plugging of the channel. Thus airtight syringes are used and the entire system is flushed with pure toluene before silanization. After the coating, the device channels are washed sequentially with acetone and ethanol pumped through them and finally blown dry in a stream of nitrogen prior to use.

We use toluene-water as the model system. In operation the side-channel is filled with toluene. Then the total head applied, $\Delta P_T$, the difference in pressure between the point of intersection of the side and the main channel—the separator inlet, and that at the outlet (at the end of a tube attached to the side channel), determines the rate of flow of sampled fluid. Once again prewetting prevents the non wetting phase (water) from entering the sampling channel.

Figure 11A:
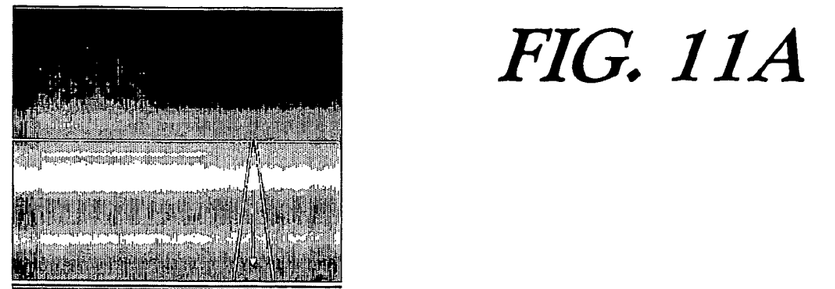
FIGS. 11A-B show an exemplary embodiment of a sampling system.
Figure 11B:
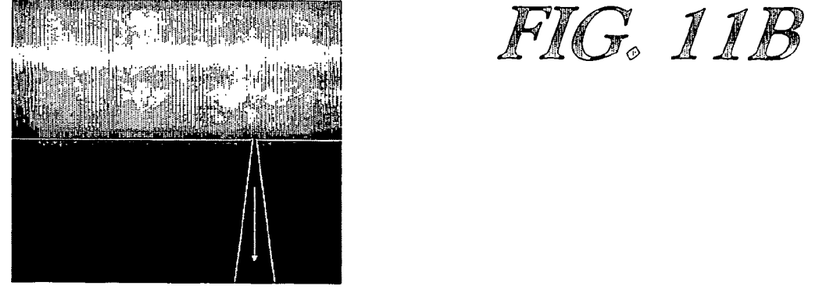

We sample toluene from the mixture at different velocity combinations of the two phases. We color the water with rhodamine (fluorescent dye) for visualization purposes, and observe exclusive sampling of toluene from the two-phase mixture, (FIGS. 11A-B).

The applied pressure differential controls the flow rate of the sampled toluene. Alternately, a suction applied to the outflow end connected to the syringe pump operated in the withdraw mode is used. Since this method continuously draws toluene from the main channel flow at a constant flow rate, it should only be used when the two-phase flow in the channel contains the wetting fluid (toluene). If no toluene is present, the prewetting toluene will be drawn away and water phase will ultimately be pulled into the sampling channel. We manipulated the pressure at the outflow end of the side channel to obtain a desired sampling flow rate for toluene low enough (~5% of that in the main channel and lower), so that the main channel two-phase flow is undisturbed.

Example 4

Sampling with Integrated Sensing

We also used the same concept for sampling water from an air-water two phase flow in the main channel. In this case, a fluorescence based sensor measured dissolved oxygen in the liquid drawn from the channel. The solution of gaseous oxygen in water is a physical process and does not include a chemical reaction. Oxygen (in small quantities), is easy to handle and readily available. Moreover oxygen is of high importance in many applications, including aerobic growth of bacteria. Absorption of gas into the liquid phase and desorption from the liquid is key to a host of chemical processes. Exchange of oxygen and $CO_2$ gases between air in the lungs and the blood flowing in thin capillaries is key to supply of fresh oxygen to cells. In light of the above, we considered the oxygen-water system as an appropriate model directly relevant to a number of areas.

The measurement of oxygen concentration in liquids was done using a method based on the quenching of the fluorescence in dyes, commonly ruthenium based organic material. Such probes have been in use to monitor oxygen concentration in bioprocess monitoring. They require only optical access which is advantageous in environments where traditional electrochemical sensors is problematic.

Figure 12A:
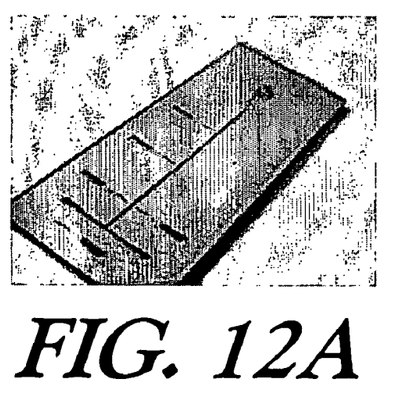
FIGS. 12A-B show an exemplary embodiment of a sampling system.
Figure 12B:
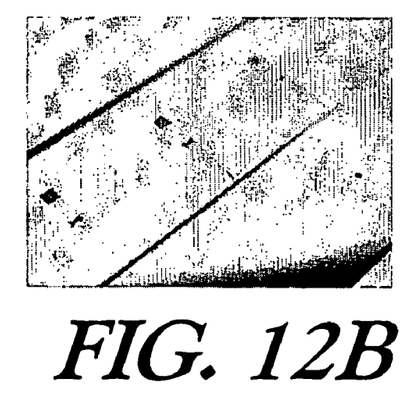

The microchannel used for the purpose of mass transfer measurements is shown in FIGS. 12A-B. The fabricated microchannel has separate inlets for the introduction of liquid and gas phases. The two fluids flowing in from the inlet meet at the beginning of a main channel 470 um deep, 400 um wide and 4 cm long. A sampling port is provided at a point 25 mm along the main channel to draw liquid out exclusively from the gas-liquid mixture and in the liquid inlet line for measurement of the initial gas concentration of the liquid. Additional ports are provided at other points along the channel which can also be used for concentration measurements.

Figure 13A:
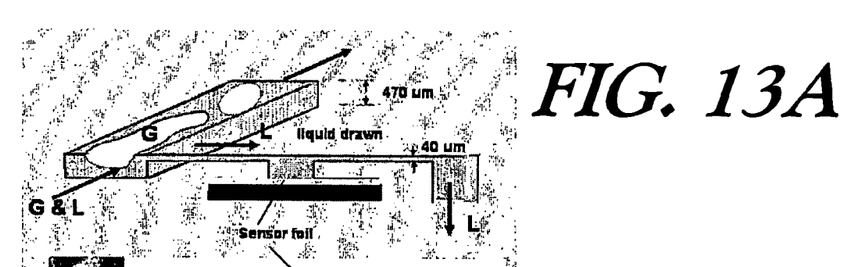
FIGS. 13A-B show schematic views of a sampling system.
Figure 13B:
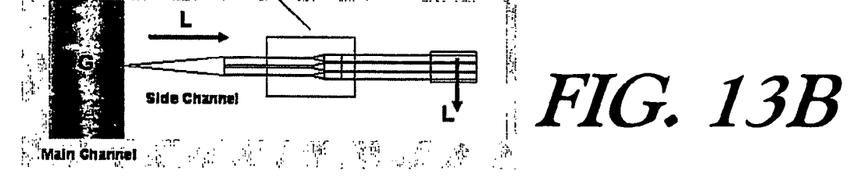

FIGS. 13A-B show schematics of sampling liquid from a transient gas-liquid flow. A smaller channel, (10 μm wide and 40 μm deep at the point of intersection with the main channel, and expanded after a length of 50 μm, to minimize pressure drop and accommodate a larger area for the sensor), is made to interface with the main channel. This channel is connected to a syringe pump using a 1/16" OD and 0.5 mm ID transparent PTFE tubing. The smaller channel is filled with liquid, free of any air bubbles to continuously draw out about 5% of the liquid from the gas-liquid mixture. Alliteratively liquid can also be drawn out by imposing a hydrostatic pressure difference between the point of intersection of the drawout channel with the main channel and the liquid outlet at the end of tubing connected to a port on-chip, after the sensing region. The surface tension force acting at the intersection of the main and the sampling channels prevents any gas from being drawn into the channel, while liquid is continuously sampled.

Providing for an on-chip sensing allows measurements free from delays due to dead volumes inherent to microscale fittings and connections required to carry the sample from the microchannel to an off-chip sensing system. This dead volume not only leads to a much slower response but also a possibility of larger errors due to a long path for the liquid sample before it reaches the sensor.

Example 5

Separators as Valves

Integration of multiple fluidic functions in chemistry and biology on microscale requires transfer of fluids from one microfluidic component another and valves are important in controlling flow between components. The ability of the fluid-phase separator to resist the flow of one phase for pressures less than the maximum pressure (i.e., the local capillary pressure) can be used to design-valves on microscale that do not rely on deformation of flexible materials. Such valves can be realized in many materials including silicon, glass, and polymers.

Figure 14A:
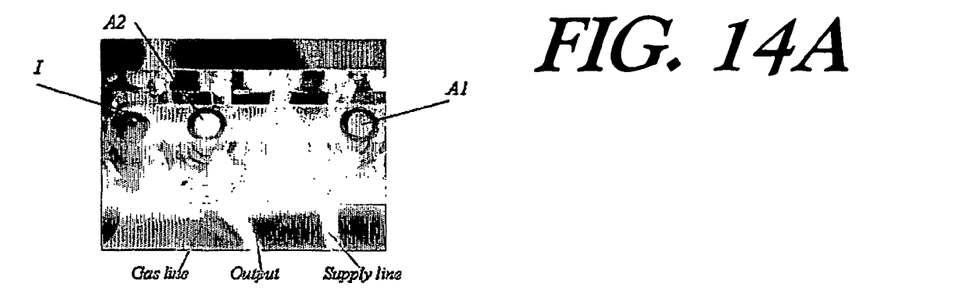
FIGS. 14A-B show, respectively, a photograph of a separation system and a schematic diagram thereof.
Figure 14B:
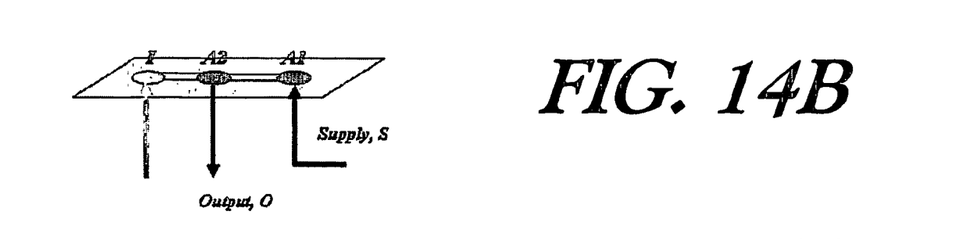

We demonstrate such a valve using glass capillary arrays and microchannels machined in plastic. The device realized and the schematic of the valve is shown in FIGS. 14A-B. The device consists of two-glass capillary arrays (A1 and A2), placed into recesses in a Plexiglas substrate. A1 and A2 are connected by a microchannel machined on the substrate top. The microchannel on the substrate extends to connect A2 to a port on a substrate further connected to a gas (nitrogen) line, allowing application of a desired pressure through a compressed air source, input, I. In this way A2 is between I and A1, all connected through the channel on the top surface. Additionally, from the bottom side of the plexiglass substrate A1 is connected to a supply of liquid (water) from a fixed pressure source, S, (realized through a reservoir maintained at a certain elevation above the device). A2 is also connected to an outlet, O, through a tubing. In operation, liquid fills the capillaries in A1 and A2. A pressure $P_S$ is maintained at the reservoir source S, and $P_O$ at O while A2 is maintained at a pressure higher than O, through a hydrostatic head $\Delta P_{h2}$. In this configuration the pressure of air at the input, $P_I$ is manipulated to control liquid flow to the outlet and the 'on' (when liquid flows to O, we identify this state of output as O=1) and 'off' (when liquid is stopped at A1 and does not flow to O, we identify this state of output as O=0) states for the valve are realized. When $P_I<P_S$, (we identify this state of input as 'I=0') liquid flows from the reservoir to A2 and to the outlet O under the influence of $\Delta P_{h2}$. The valve is switched to the 'off' state conveniently by increasing $P_I$ such that $P_I>P_S$, at which point air from the input drives liquid out from the fluid path on the substrate. Air cannot get to the outlet or through A1 to S, due to the pressure drop across the liquid meniscus formed in the capillaries of A1 and A2.

Figure 15A:
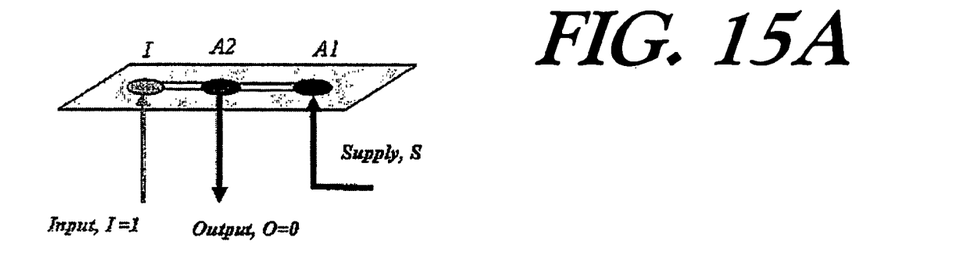
FIGS. 15A-B show schematics of respective states of a valve.
Figure 15B:
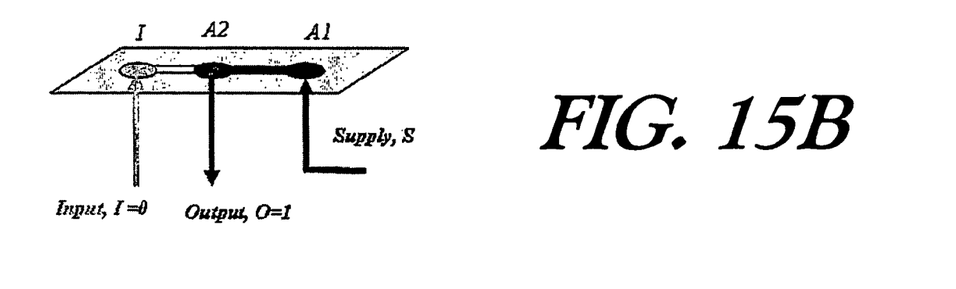
Figure 16:
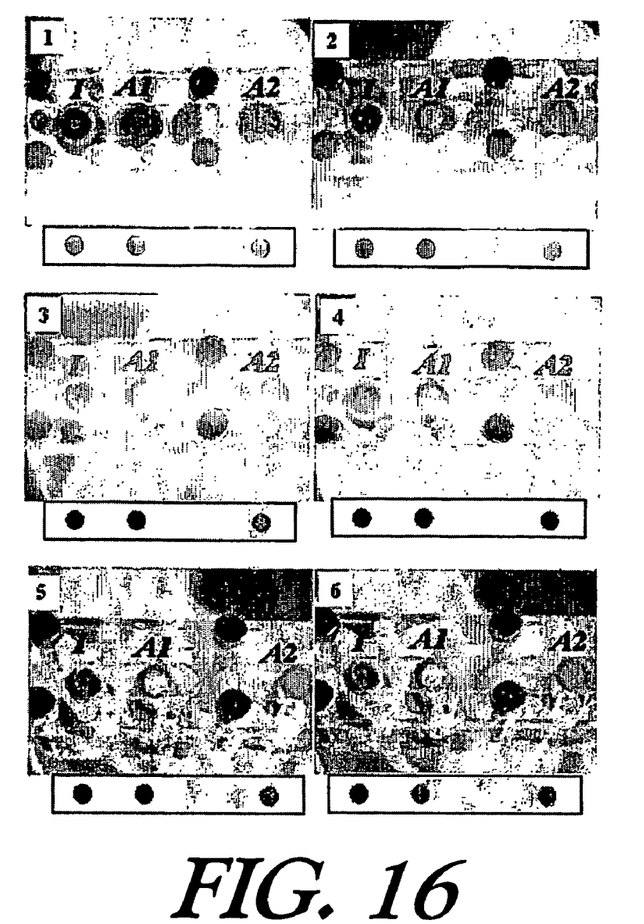
FIG. 16 shows photographs of various valve operation states.

FIGS. 15A-B show schematics of two states of operation of the device and FIG. 16 shows the valve in operation along with some of the intermediate actuation stages. In FIG. 16, different intermediate states in operation of the valve are shown: State 1, I=0 and O=1. State 2 and 3, when I=1 the meniscus in the microchannel on the substrate advances towards A1. State 4, I=1 and O=0, the meniscus is stopped at A1 and air cannot get into either A1 or A2 due to meniscus in the capillaries. State 5, when I=0 the meniscus in the microchannel on the substrate advances back towards A2. State 6, once again the initial state: I=0 and O=1 is restored, with liquid flow received at O.

Figure 17:
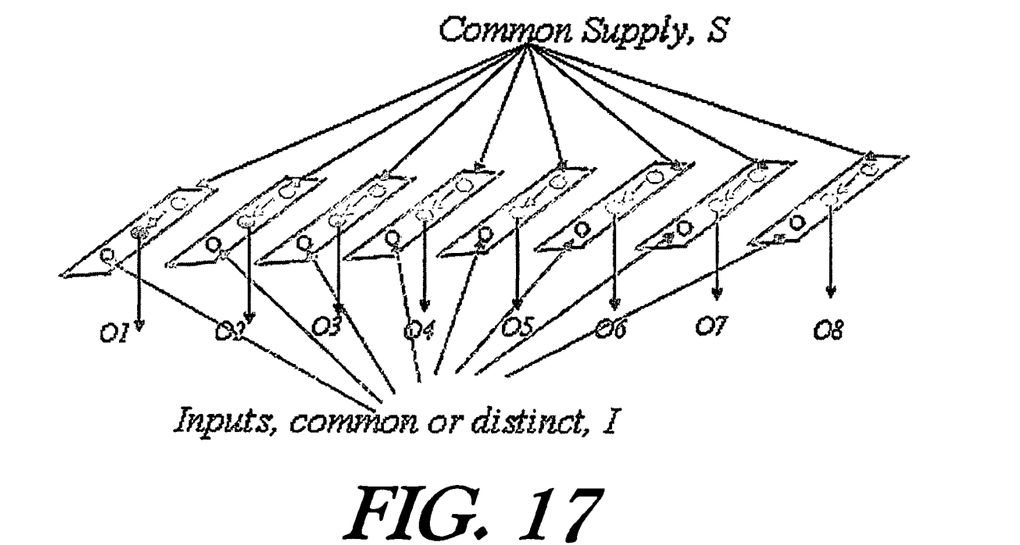
FIG. 17 shows a schematic showing connection and control of multiple valves.

Using this concept multiple liquid lines can also be controlled using a single compressed air line, (FIG. 17).

Example 6

Fluid Logic on Microscale

Figure 18:
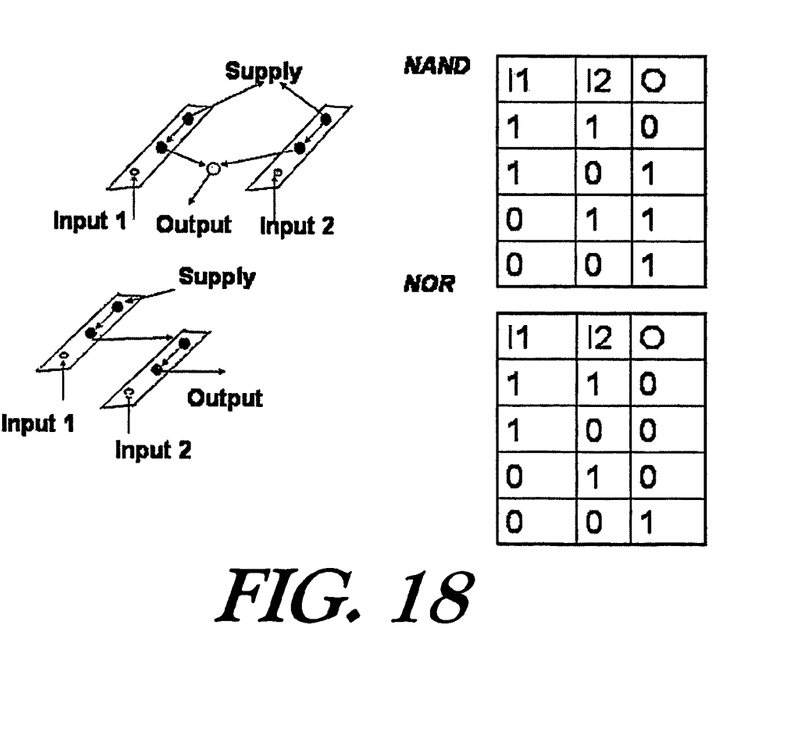
FIG. 18 shows examples of basic logic gates that can be effected with valves.

Mathematical logic realized through fluidic manipulations is useful in situations where electrical connections are undesirable and a high speed for response is not critical. The attraction from the possibility of building computational control mechanisms directly into microfluidic systems developed for analysis, rather than using electronic microchips to control the flows, is recognized as perhaps the most attractive potential of microfluidic computation. The NAND and the NOR are fundamental logic gates and can be used as basic units to realize complicated logical functions. Let us consider a two input (I1, I2) and one output (O) mappings where the inputs and outputs can each assume two values (0 or 1). Such binary representation of output and inputs in chemical systems can be associated with different levels of a physical variable like temperature, pressure concentration etc. A NAND gate is the complement of a logical AND function and for this gate O is equal to zero only when both I1 and I2 are equal to 1. For all other input level combinations O=0, (FIG. 18). The NOR gate is complement of the logical OR function and here O is equal to 1 only when I1 and I2 are both 0.

Example 7

Liquid Mixing in Microscale Slug Flow by Introduction and Subsequent Removal of Gas To characterize the gas induced mixing, we designed and fabricated three different characterization devices as silicon-glass and polymer-glass hybrids. The devices include fluidic inlets for the two liquid phases, an inlet for the inert gas to be introduced into the co-flowing liquid streams, a mixing section forming a segmented gas-liquid flow, a gas-liquid separator and outflow ports for the mixed liquid and the gas phase. Because of the small flow rates considered, it was sufficient to feed the liquid and gas streams by separate syringe pumps (Harvard Apparatus PHD 2000).

A. Characterization Device in Silicon

Figure 19:
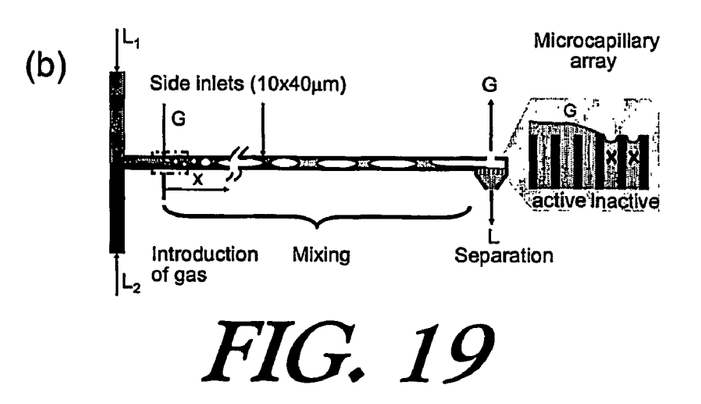
FIG. 19 shows a schematic of a separation device.

The device formed in silicon and Pyrex is schematically shown in FIG. 19. Liquid streams $L_1$ and $L_2$ are introduced from two separate inlets, they meet at a tee, and flow through the mixing channel with a length corresponding to $94 \cdot d_h$ (the hydraulic diameter is defined as $2/(1/w+1/d)$, where w and d denote the channel width and depth) into a joint outlet with a gas-liquid separator. Gas is introduced from a side inlet of cross section 10×40 μm that is located $20 \cdot d_h$ downstream of the tee and a gas-liquid separator is located at the end of the mixing channel.

The device was formed by using several photolithographic steps, nested deep reactive ion etching (DRIE), thermal wet oxidation, and anodic bonding. To begin the fabrication process, a 0.5 μm thick oxide layer was thermally grown on a 150 mm diameter, 650 μm thick double-side polished (100) silicon wafer. Three photolithographic masks were used to pattern the silicon wafer: two masks on the front and one at the backside. The back side is processed first. The fluidic inlet and outlet ports and the separator capillaries are patterned with thick resist at the wafer backside. The 500 μm-diameter inlet holes, and the outflow port including a 3 mm diameter array of 20 μm diameter capillaries were formed during a DRIE etch. After removing the resist, a 0.5 μm thick layer of thermal oxide layer was grown on the wafer to protect the capillaries during the connecting front side etch.

For processing the front side, two masks are used for the nested 40 μm and 430 μm DRIE etch steps forming the 40 mm long microchannel of width 400 μm and depth 470 μm (hydraulic diameter, $d_h$=433 μm) and several shallow side inlet channels (depth 40 μm). Nested masks use two masking materials, silicon oxide and thick resist, to photolithographically pattern the substrate features that will ultimately have two different etch depths. The wafer is mounted to a quartz handle wafer. After a 430 μm deep DRIE etch, the thick resist pattern was stripped in a mixture of hydrogen peroxide and sulfuric acid (volumetric ratio: 1:3) so that the second (silicon oxide) pattern remains for a 40 μm deep etch that forms the shallow side channels. After completing the fabrication at the front side, the oxide pattern was stripped in a buffered oxide etch (solution of HF and $NH_4F$, 10:1), and a new layer of thermal oxide (0.5 μm thick) was grown to protect the features at the front side when etching the backside since this etch step forms connections through the wafer to the front side. All photomasks were fabricated by electron-beam writing (Photronics, Brookfield, Conn.).

After removing the resist, a 0.5 μm thick layer of thermal oxide layer was grown on the wafer to render the channel walls surfaces hydrophilic before anodic wafer-level bonding (450° C., 800V) to a drilled Pyrex wafer (7740, diameter 150 mm, 762 μm thick). Gas-liquid flows in the silicon device were visualized using a packaging scheme that allowed optical access to the microchannels through the front side was used. PEEK tubing (Upchurch Scientific, 1/16" OD) and front ferrules (Swagelok, 1/16" OD) were directly attached with epoxy to the fluidic ports on the backside of the flow chip bonded to the oxidized silicon surface. The epoxy was cured at ambient temperature for at least 24 hours, prior to use. Teflon outlet tubes were 300 mm long.

B. Polymer-Based Devices

Two fluidic demonstration devices to investigate mixing in curved channels and multistage mixing and separation were fabricated in poly dimethylsiloxane (PDMS) by using standard soft-lithographic techniques (e.g., as described in U.S. Pat. Nos. 6,706,165, 6,686,184, 6,645,432, and 6,541,539). PDMS (Dow Corning Sylgard Brand 184 Silicone Elastomer, Essex-Brownell Inc.) was molded on masters fabricated on silicon wafers using SU-8 (50) (Negative photoresist, Microchem Corporation, Mass.). Typically, 150 μm thick SU-8 films were spun on 100 mm diameter silicon wafers (Silicon Quest International). Photolithography was used to define negative images of the microfluidic channels, and the wafers were developed using SU-8 Developer (Microchem Corporation). Packaging of the PDMS based devices was accomplished by molding PDMS on the SU-8 masters at 70° C. for 4-12 hours. The devices were then peeled off the mold, cut and cleaned. Inlet and outlet holes (1/16-in. o.d.) were punched into the material. Individual devices were sealed to pre-cleaned microscope slides (25×75 mm, 1 mm thick, VWR Scientific Inc.). Both surfaces were activated in an oxygen plasma (Harrick Co., PDC-32G) for 45 seconds prior to sealing. PEEK tubing (1/16-in. o.d., 508 μm i.d., Upchurch Scientific.) was inserted in the inlet and outlet holes, and glued in place with 5-min epoxy (Devcon). The epoxy was cured at 70° C. for at least 12 hours, prior to use. Outlet tubes were 30 mm long, corresponding to a volume of 6.1 μL.

C. Capillary Phase Separator

After passing the flow channel, a complete separation of the mixed hexane streams and the gas phase is achieved in an integrated separator located at the outflow end of the channel. The microfabricated flow channel expands into a cylindrical space of 3-mm diameter that contains at its bottom side several thousands of capillaries, each one approximately 20 μm in diameter. If the capillaries are immersed in liquid at the side opposing the microchannel and if a differential pressure is applied at this location, the any liquid approaching the capillary array is removed through it. The gas remains in the channel and is drawn from a 2 mm hole through the Pyrex wafer above the capillary array. A complete phase separation is achieved even for transient (slug) flow since individual capillaries readily remove liquid while preventing gas penetration as long as the applied pressure differential does not exceed the capillary rise pressure in the individual capillaries.

D. Planar Demonstration Device

Figure 20:
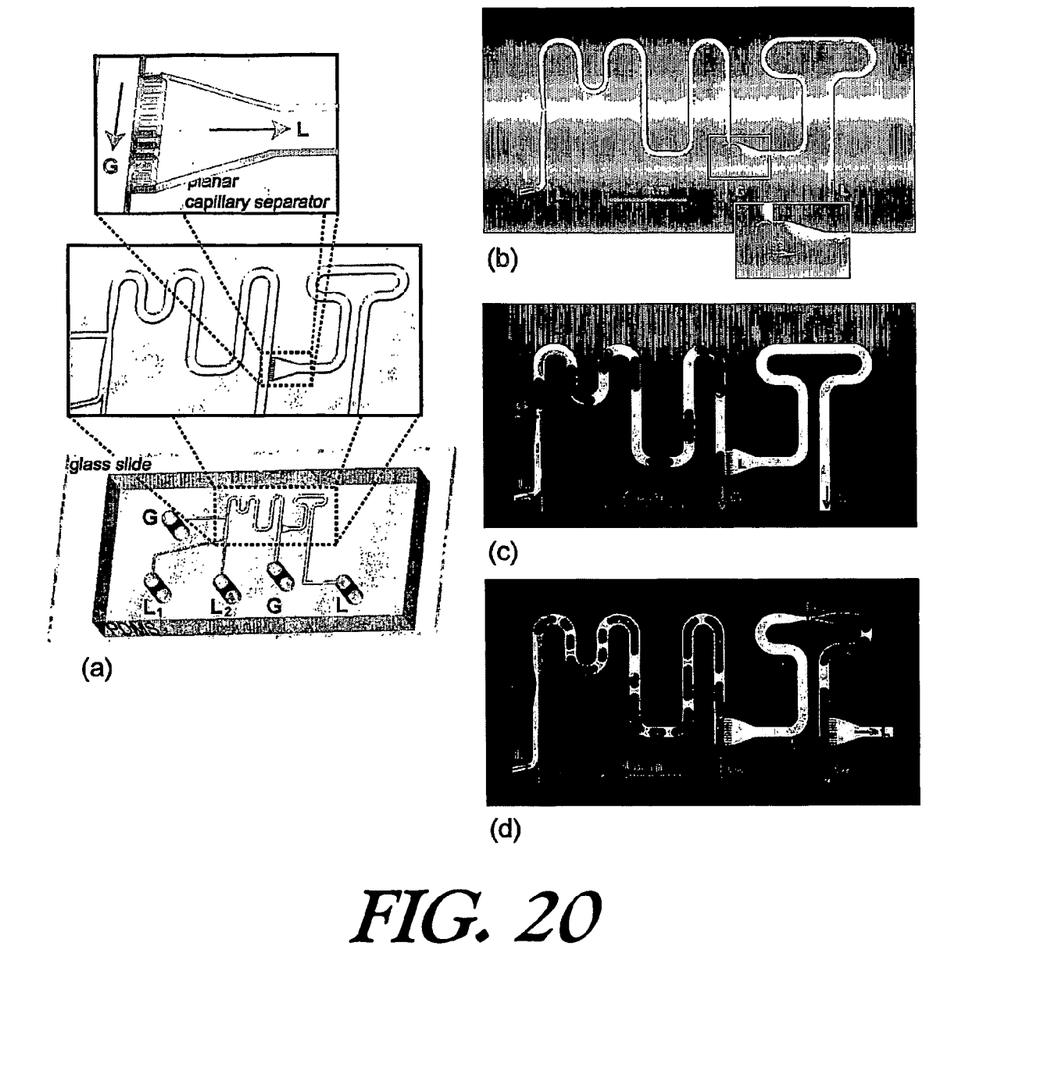
FIG. 20 shows schematics and photographs of a separation device.

FIG. 20A shows a demonstration device of a slug-flow micromixer that combines multiphase flow in a rectangular cross section with a planar design o f the capillary separator that can be fabricated in a single soft lithography step. The process requires only one photolithographic mask, where a silicon wafer is coated with the negative resist SU-8, exposed, developed and used as a master for molding fluidic devices in PDMS. By using an oxygen plasma, the PDMS device is bonded to a microscope coverslide. FIGS. 20B-C show images of pulsed-laser fluorescence micrographs obtained for a single-stage version of the mixer-separator. Two liquid streams, $L_1$ and $L_2$, with different concentrations of fluorescent dyes are fed into the device. In FIG. 20B, no gas is fed into resulting in mixing lengths that cannot be accommodated in the design. The liquid streams are unmixed when they leave the device. Note that the gas-liquid separator is functioning even though no gas-phase is fed through the device. FIG. 20C shows the operation of the device with gas phase present. Both liquid streams are efficiently mixed in the slug flow and the mixed liquid is completely separated from the gas. FIG. 20D demonstrates that even a 2-stage version of the mixer-separator is can be successfully operated.

The examples should not be construed as limiting in any way. The contents of all cited references (including literature references, issued patents, published patent applications as cited throughout this application) are hereby expressly incorporated by reference.

Those skilled in the art will recognize, or be able to ascertain using no more than routine experimentation, many equivalents of the specific embodiments described herein.

We claim:

1. A method of separating a first fluid from a second fluid, comprising:
   prewetting with the first fluid at least one channel defined by a separation device, the at least one channel thereby containing a column of the first fluid along its length;
   presenting a combined flow comprising the first fluid and slugs of the second fluid completely surrounded by the first fluid to the separation device, the at least one channel being in fluid communication with the combined flow; and
   applying a fluid pressure across the flow and separation device that does not exceed the capillary pressure in the at least one channel,
   wherein the first fluid flows through the at least one channel, and the second fluid is excluded from the at least one channel, thereby separating at least a portion of the first fluid from the second fluid.

2. The method of claim 1, wherein the first fluid is a liquid, and the second fluid is a gas.

3. The method of claim 1, wherein both the first fluid and the second fluid are liquids.

4. The method of claim 1, wherein the at least one channel is wetted by only the first fluid.

5. The method of claim 1, wherein the at least one channel comprises a plurality of channels.

6. The method of claim 1, further comprising adding the second fluid to a flow of the first fluid to form the combined flow.

7. The method of claim 1, further comprising performing a chemical reaction between at least one component of the first fluid and at least one component of the second fluid.

8. The method of claim 1, further comprising sensing a property of the separated first fluid.

9. The method of claim 8, wherein the property is a concentration of at least one component of the first fluid.

10. The method of claim 8, wherein the property is a temperature of the first fluid.

11. The method of claim 8, wherein the property is a pressure of the first fluid.

12. The method of claim 1, wherein the first fluid preferentially wets the at least one channel relative to the second fluid.

13. The method of claim 1, wherein all of the first fluid is removed from the combined flow as the combined flow is presented to the separation device.

* * * * *